(12) United States Patent
Tagliabue et al.

(10) Patent No.: US 11,386,057 B2
(45) Date of Patent: Jul. 12, 2022

(54) SYSTEM AND METHOD IMPLEMENTING A SEARCH AND DISCOVERY LOOP TO HELP USERS QUICKLY NAVIGATE THROUGH STRUCTURED AND UNSTRUCTURED INFORMATION

(71) Applicant: TOOSO INC., Redwood City, CA (US)

(72) Inventors: Jacopo Tagliabue, San Francisco, CA (US); Ciro Greco, Milan (IT); Mattia Pavoni, Bergamo (IT)

(73) Assignee: COVEO SOLUTIONS INC., Quebec (CA)

(*) Notice: Subject to any disclaimer, the term of this patent is extended or adjusted under 35 U.S.C. 154(b) by 0 days.

(21) Appl. No.: 16/625,002

(22) PCT Filed: Jun. 22, 2018

(86) PCT No.: PCT/IB2018/054616
§ 371 (c)(1),
(2) Date: Dec. 20, 2019

(87) PCT Pub. No.: WO2018/235042
PCT Pub. Date: Dec. 27, 2018

(65) Prior Publication Data
US 2020/0142869 A1    May 7, 2020

Related U.S. Application Data

(60) Provisional application No. 62/523,355, filed on Jun. 22, 2017.

(51) Int. Cl.
*G06F 16/00*    (2019.01)
*G06F 16/215*    (2019.01)
(Continued)

(52) U.S. Cl.
CPC .............. *G06F 16/215* (2019.01); *G06F 9/54* (2013.01); *G06F 16/22* (2019.01); *G06F 16/245* (2019.01); *G06F 16/252* (2019.01)

(58) Field of Classification Search
CPC ...... G06F 16/215; G06F 16/22; G06F 16/245; G06F 16/252; G06F 9/54
See application file for complete search history.

(56) References Cited

U.S. PATENT DOCUMENTS 8,407,197 B2    3/2013   Zasman et al.
2008/0306908 A1    12/2008   Agrawal et al.
(Continued)

OTHER PUBLICATIONS

International Search Report and Written Opinion issued in International Application No. PCT/IB2018/054616, dated Sep. 5, 2018 (12 pages).

*Primary Examiner* — Tyler J Torgrimson
(74) *Attorney, Agent, or Firm* — Bookoff McAndrews, PLLC (57) ABSTRACT

A system for searching and discovering information where a first server is provided with a digital catalogue of products and is connected to a communication network. The first server communicates with a front-end client associated to an user and connected to said communication network, and with a back-end server connected to said communication network. The back-end server has in turn an indexing section for processing the data of said digital catalogue in order to extract and save relevant data of said digital catalogue in an index, and a runtime section adapted to interpret the user query on the front-end client, compare the search information and/or the user behavior with said index and send to said front-end client suggestions to the user on how to refine said query.

6 Claims, 8 Drawing Sheets

(51) Int. Cl.
*G06F 16/22* (2019.01)
*G06F 16/245* (2019.01)
*G06F 16/25* (2019.01)
*G06F 9/54* (2006.01)

(56) References Cited

U.S. PATENT DOCUMENTS

| | | | |
|---|---|---|---|
| 2009/0083232 A1* | 3/2009 | Ives | G06F 16/3322 |
| 2010/0281107 A1* | 11/2010 | Fallows | H04L 67/42 |
| | | | 709/203 |
| 2015/0269175 A1 | 9/2015 | Espenshade et al. | |
| 2015/0324425 A1* | 11/2015 | Behzadi | G06F 16/9537 |
| | | | 707/759 |
| 2016/0012122 A1* | 1/2016 | Franceschini | G06N 5/025 |
| | | | 707/739 |
| 2018/0210901 A1* | 7/2018 | DePaoli | G06Q 30/0276 |

\* cited by examiner

```
{
    "Code": "200",
    "ObjectId": "69977517-cff2-447c-b770-ab00ff4c8082",
    "Content": {
        "SearchId": "69977517-cff2-447c-b770-ab00ff4c8082",
        "Results": ["12518309", "131241", "841381"],
        "Discovery": [{
            }, {
                "price": "100 euros"
                "brand": "Gucci"
            }]
    }
}
```

SYSTEM AND METHOD IMPLEMENTING A SEARCH AND DISCOVERY LOOP TO HELP USERS QUICKLY NAVIGATE THROUGH STRUCTURED AND UNSTRUCTURED INFORMATION

CROSS-REFERENCE TO RELATED APPLICATIONS

This application is the U.S. National Stage Application under 35 U.S.C. § 371 of International Application No. PCT/IB2018/054616, filed on Jun. 22, 2018, now published as WO 2018/235042 A1, which claims the benefit under 35 U.S.C. § 119(e) of U.S. Provisional Patent Application No. 62/523,355, filed on Jun. 22, 2017.

FIELD OF THE INVENTION

The present invention generally relates to the field of information search and discovery. Particularly, the invention provides a method and system for digital content search and discovery.

BACKGROUND ART

In recent times, information technology has massively pervaded every aspect of life. Internet and the World Wide Web deeply changed the way of communicating, doing business, searching for information. E-commerce has quickly flourished and established and it is getting more and more important every year.

Digital content or information is normally searched and discovered by way of manually entering corresponding search query in a search field, being that search field part of a website or of a mobile phone application.

The present disclosure allows users on digital shops (e.g. eCommerce websites), digital portals (e.g. a web portal hosting reviews of movies), mobile apps or, more generally, any user interface, to have a more natural and rewarding search experience when searching within a list of available items like products in an e-commerce catalogue, reviews in a portal database, etc.

SUMMARY OF THE INVENTION

The present disclosure regards a search system based on artificial Intelligence, provided with a front-end or client side—e.g. the code executed on the client side, for instance on a web browser, on a mobile phone application, etc.—and a back-end side—e.g. the code executed on the server side—and adapted to allow an interactive "search loop" between the user and the search system.

This "search loop" between the user and the search system guides the user through his/her search by providing targeted suggestions.

BRIEF DESCRIPTION OF THE DRAWINGS

The present disclosure will become more apparent from the following description of exemplary embodiments to be considered in conjunction with accompanying drawings wherein.

DETAILED DESCRIPTION OF THE INVENTION

Figure 1:
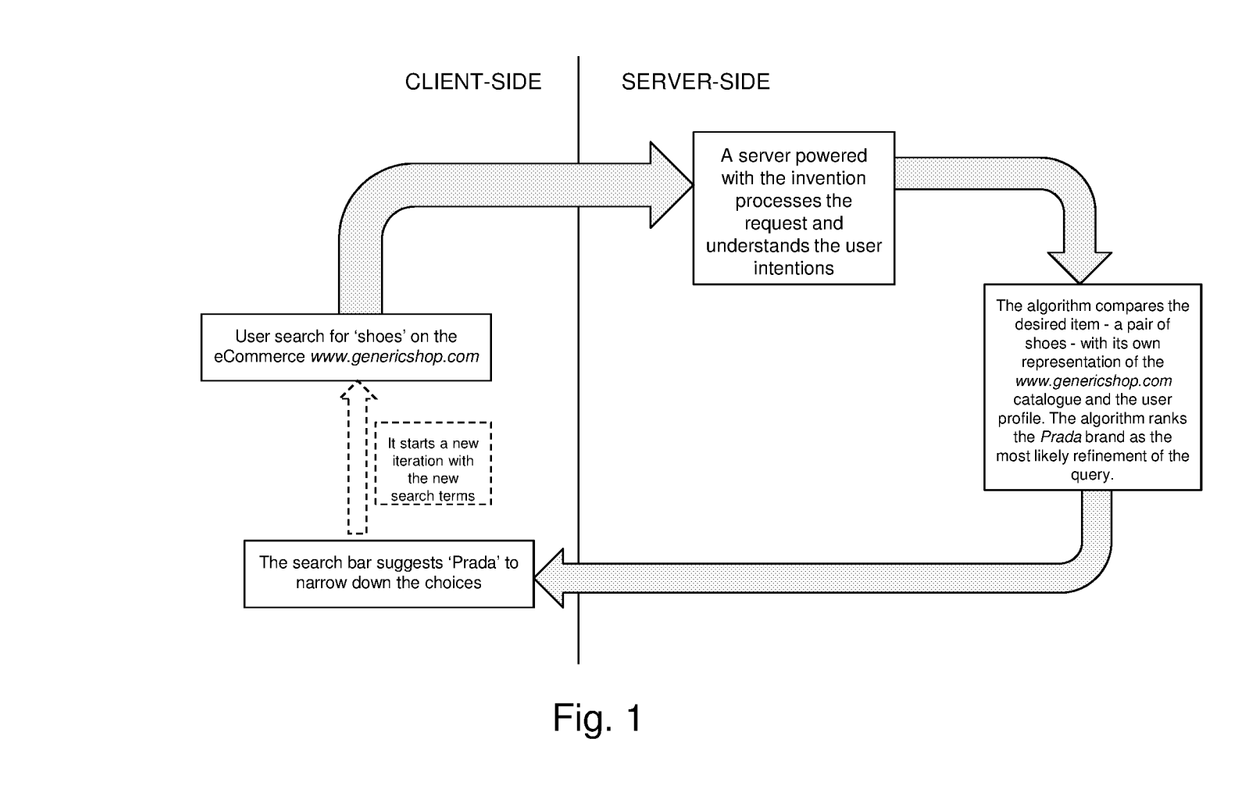
FIG. 1 shows a schematic diagram of a very high-level overview of the system according to the present disclosure.
Figure 2:
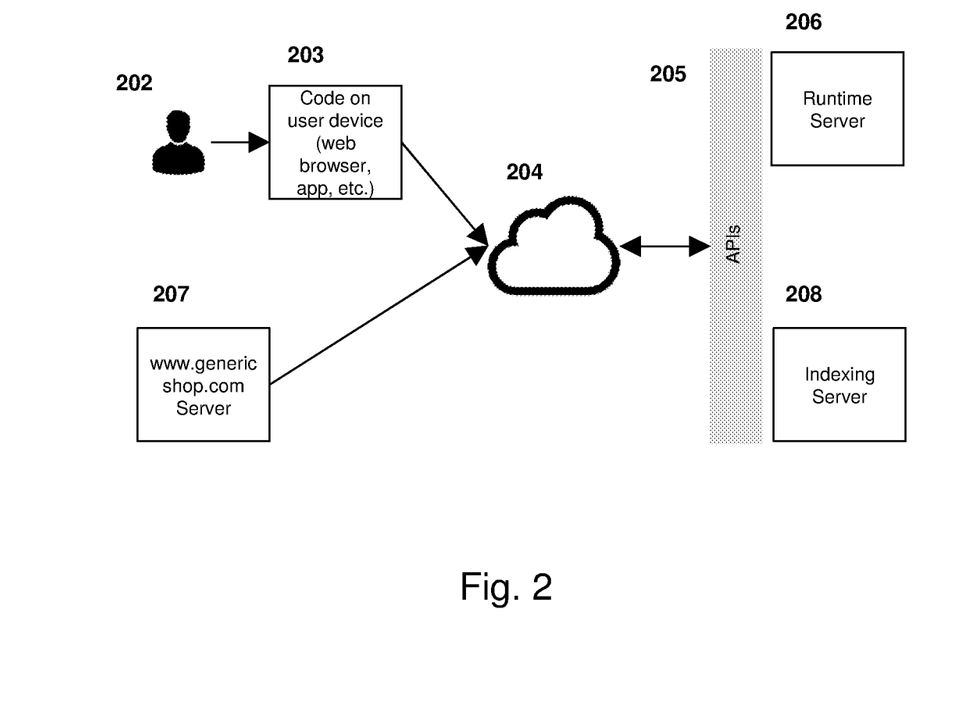
FIG. 2 details a high-level implementation of a preferred embodiment of the system according to the present disclosure, involving a digital shop and the client and server code.

With reference to enclosed FIG. 2, a possible high-level implementation of the client and server sides of the system according to the present disclosure is shown, referred to a digital shop.

The main component powering the interaction between the front-end or client side and the back-end or server side of the system according to the present disclosure is the set of APIs 205 made available from the infrastructure. The set of APIs is one among the possible interactions between the client and the server sides: generally speaking, an Internet connection 204 or any viable communication channel between the client and server side is required. As an example, in a standard client-server infrastructure, we consider an internet connection. Any client code available in the art can be used to send the information from the client to the server. Then, the client side code 203 according to the present disclosure is adapted to transform the server response into the discovery feature of the present invention.

The server-side is provided with two components:

An offline/indexing component or indexing server 208, adapted to analyze the catalogue sent by the server of a digital shop 207, extract and save relevant data in a proprietary index, and An online/querying component or runtime server 206, adapted to interpret the user queries, compare the search information and/or the user behavior with the proprietary index and suggest the most appropriate way of directing user search.

Figure 3:
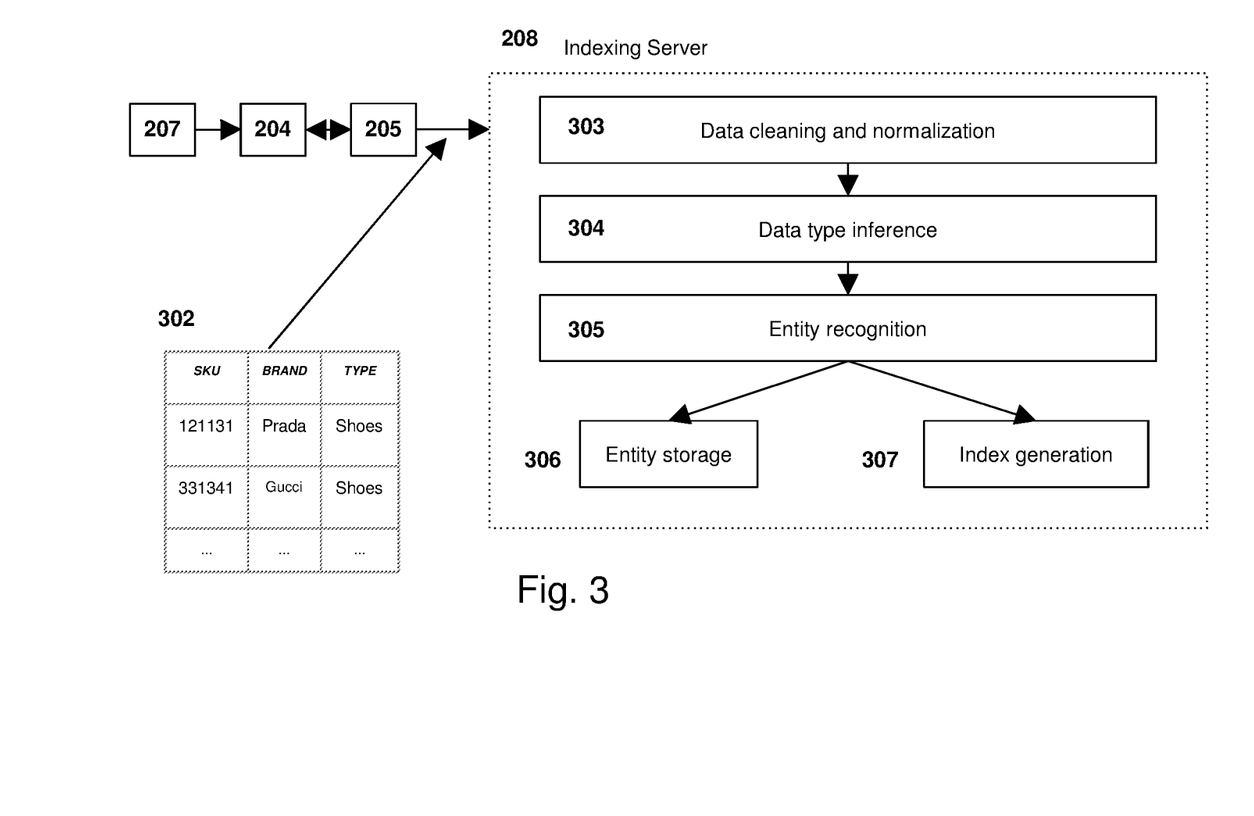
FIG. 3 shows a schematic diagram of the server side processing of a preferred embodiment of the system according to the present disclosure, the processing being related to the ingestion of data from the relevant data store and the subsequent processing of the data to derive a compact representation of the information therein contained in a data structure.
Figure 4:
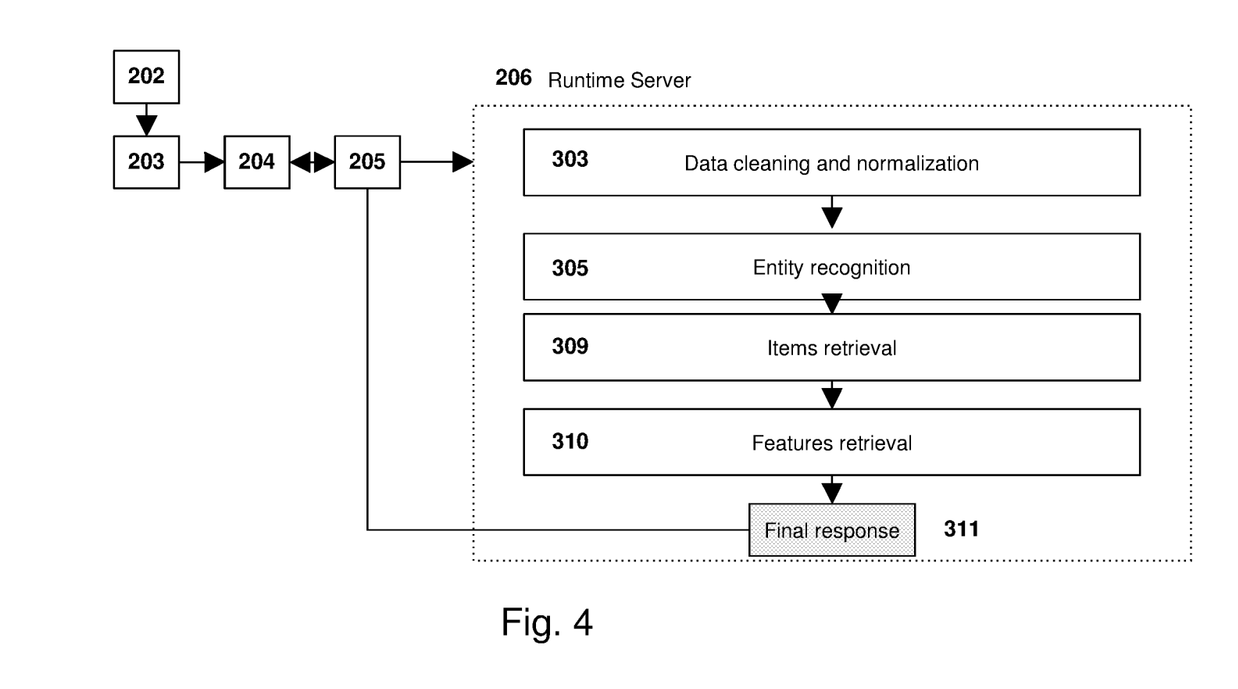
FIG. 4 shows a schematic diagram of the server side processing of a preferred embodiment of the system according to the present disclosure, the processing being related to the querying of the data structure by combining different factors.

Accordingly, the back-end side or server side processing of the system according to the present invention comprises two distinct phases:

reading and indexing of data acquired from the relevant data store—e.g. a digital catalogue of an eShop in a standard text format, like CSV—and the subsequent processing of the acquired data to derive a compact representation of the information therein contained in a data structure as shown in enclosed FIG. 3; this action is performed by the indexing server 208;

querying of the data structure by combining different factors, including (but not limited to) the following: user's navigation data, search query, target language, data source (e.g. catalogue) features, extracted ontologies etc. as shown in enclosed FIG. 4; this action is performed by the runtime server 206.

In further detail, the reading and indexing of data starts when a digital shop server/infrastructure/facility 207, connected to a network like e.g. the Internet 204, sends a digital copy of the target data source to be indexed (e.g. a CSV file containing the products of the digital shop with their characteristics, such as depicted in a table format 302) to the indexing server 208 of the back-end side of the system according to the present invention (e.g. by making a POST request to the available APIs 205). Then the back-end indexing server 208 analyzes the incoming data performing the following actions:

Data cleaning and normalization 303: the data is cleaned and normalized—as a matter of non-limiting example, HTML tags can be removed and whitespace and punctuation normalized, or special characters (!,%,^,*) replaced;

Data type inference 304: for each column/field in the data, the data type of the column (e.g. text, html, unique identifier, floating point number, image, boolean etc.) is detected and then an assessment (e.g. by assigning a confidence score) is made of how useful a certain field is for the final index. Furthermore, if the column type allows it, additional metadata may be added to the data source (e.g. an image field allows image analysis and visual object recognition, whose results can be added for further processing steps);

Entity recognition 305: based on the output of the previous step 304 the fields that are deemed to be useful are analyzed and objects and properties are extracted from the relevant fields. One example of the implementation of this step would be extracting structured information from the following sample row:

| sku | description | brand | colors | price |
|---|---|---|---|---|
| 1231213313 | These classic loafers take on a unique aesthetic thanks to a distinctive woven texture that adds a layer of dynamism to this Spring Summer accessory. | Gucci | white, red | 100.00 |

This processing step would extract shoes as a general product category (i.e. loafers are a type of shoes), white, red as colors options, Gucci as a brand and 100 dollars as the target price.

This processing step can be implemented in several ways, often combining different approaches depending on the industry and contextual factors: for the sake of non-limiting example, the following procedures could be used, alone or jointly: rule-based tagging, regular expressions, statistical procedures such as Conditional Random Fields and Hidden Markov Models, neural networks, Bayesian inference, automated reasoning from formal ontologies, etc.

Entity storage 306: the results of the step of Entity recognition 305 are stored in a database to be retrieved later at query time. Many data structures can be used to implement the storage: as an example, this type of storage can be implemented in a relational database, a NoSql database, an in-memory cache, an inverted-index (proprietary or available through open-source/licensed software) etc.

Index creation 307: the results of the step of Entity recognition 305, together with the information contained in all the relevant fields singled out in the step of Data type inference 304, are then used to build the index, a data structure allowing efficient retrieval of items based on user queries and other analysis. Information comprising the data structure may include (not limited to) inverted index, user historical data (e.g. onsite behavior, behavior on other sites as acquired through cookies or other digital means, etc.), website historical data (e.g. clicks on specific products, visits to pages, etc.), industry specific lexical information, etc.

In further detail, the query processing starts when a user 202 lands on website's page by any suitable user interface, like a PC browser, a mobile app, etc. and performs a search in the search bar. The search can be performed by any available means, by typing, speaking or any other signaling system provided a conversion from client to server is executed. The system according to the present disclosure is compatible with all kinds of user interfaces and it is not limited to web pages or mobile apps. Considering as an example that said user interface is a PC browser, said browser, through an Internet connection 204, sends to the servers 206 of the back-end side of the system according to the present invention (for example, making a GET requests to the available APIs 205) the query made by the user (e.g. 'shoes') and accessory information about the user session and the context (including but not limited to: the ip address, a session identifier, the language of the query, etc.). The servers 206 then process the incoming data as follows:

Data cleaning and normalization 303: see above; the cleaning performed here can match (all or in part) what was done previously at indexing time;

Entity recognition 305: see above; (e.g. the entity recognition detects that in the example query 'blue shoes', shoes is a type of product, blue is a color). Entity recognition can be implemented with a variety of procedures—as a way of example, we can consider: rule based tagging, regular expressions, statistical procedures such as Conditional Random Fields and Hidden Markov Models, neural networks, Bayesian inference, automated reasoning from formal ontologies, etc. the procedure and statistical model used here can match (in all or in part) what has been used at indexing time.

Items retrieval 309: using the index built with the data source 307, all the items that match the request by the user will be retrieved. For example, if the user asked for 'blue shoes', all the items matching this description will be retrieved, the matching being established according to (but not limited to): the entity detected in the queries and in the catalog, the specific lexicon used in an industry, the characteristic of the user and his/her previous behavior. Those items will receive a relevance score, according to (but not limited to) entity matching, text matching, tf-idf score, user preferences, user behavior as collected through previous interactions, etc. and ranked accordingly.

Features retrieval 310: based on the result of the Entity recognition 305, the data stored by the Entity storage step 306, the relevant items from 309 and possibly additional information available at runtime (e.g. information about user purchase history, user navigation) the system will determine the most appropriate feature to promote discovery in the catalog. For example, if the user search for 'blue shoes', the system may detect the fact that blue shoes are available in different price ranges, thus nudging the user to select a price range to narrow down the search, or different brands.

Figure 5:
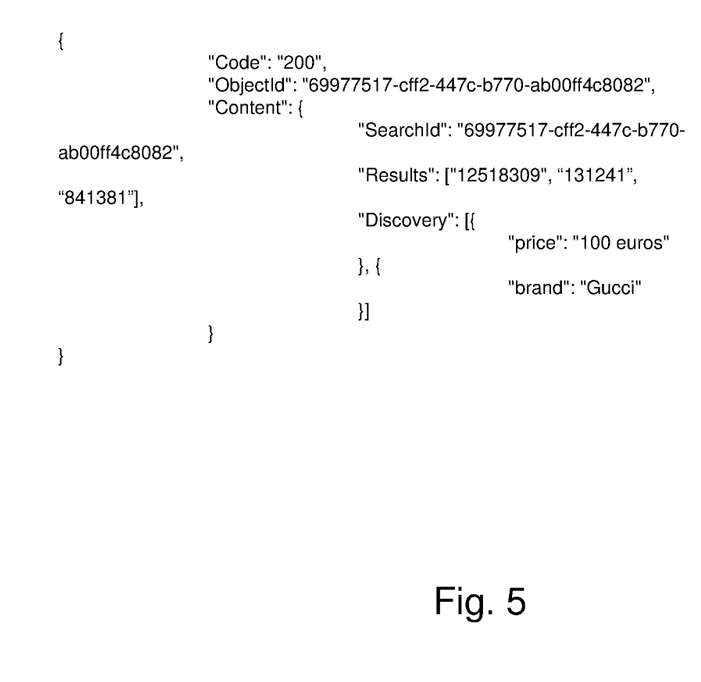
FIG. 5 shows an example of a part of the code of a response from the server comprising a Results section and a Discovery section.

Final response 311: the information from preceding steps Items retrieval 309 and Features retrieval 310 are wrapped in a convenient format to communicate efficiently with the client (e.g. the browser, the app making the search, etc.). As an example, a JSON-formatted response is illustrated in FIG. 5 as containing a list of results (specified as a list of unique identifiers) and a list of discovery features (specified as a list of object, featuring properties—"price", "brand"- and the associated suggestions—"100 $", "Gucci").

The front-end side or client side processing of the system according to the present invention operates as follows:

The response from the server 311, according to the Invention, reaches the client (e.g. the web browser or the mobile app of the user) hosting the front-end code 203 featured in the Invention, as, for example, the response from the API layer 205 through an internet connection 204.

Figure 6:
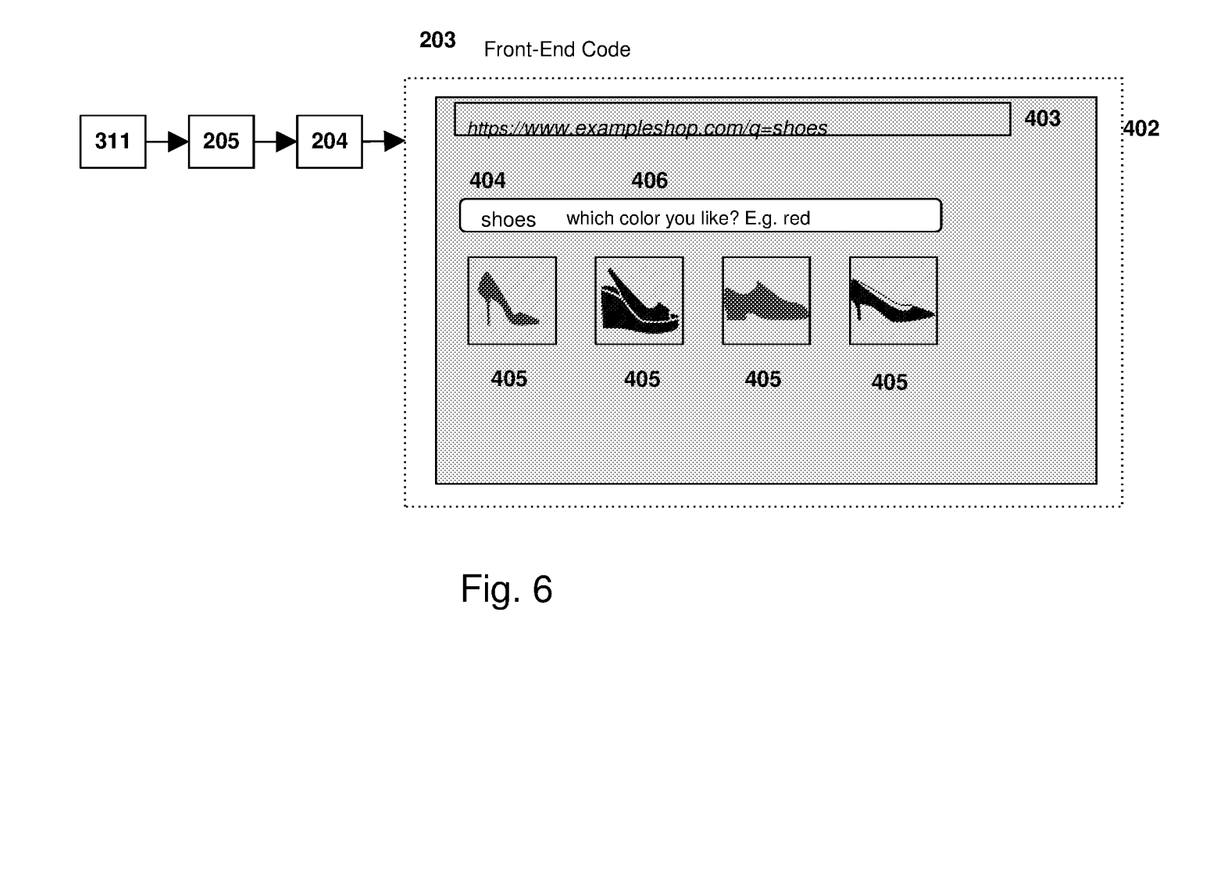
FIG. 6 shows an example of a browser visualizing a web page with a response from the server after the user previously searched for shoes in the search bar.

As depicted in FIG. 6, an example of this situation is a browser visualizing a web page 402 (the example URL 403 is visible at the top) where the user previously searched for shoes in the search bar 404. The query has been sent to the back-end server and processed as explained above and now the response 311 is available for the front-end code that is executed at the client side (in this example, the web browser). The website (or any other front-end interface) is then responsible to load and paginate the result set provided in the response (see for example the Results section in FIG. 5 wherein several type of shoes are listed).

The front-end side of the system according to the present invention will use the information contained in the response (see for example the Discovery section in FIG. 5) to augment the data present in the search bar 406: as an example, a suggestion such as 'which color would you like?' will be added after the user input 'shoes'. The front-end code may choose to augment data in the search bar as a way to engage the user in the loop of discovery: however, the Invention is not limited to textual interaction of any kind or the search bar as an interface item, as the feedback loop from search to discovery to search can be implemented in a number of ways: as a way of example, text, images, audio assistance are all possible interactions. Another example of augmented data to enrich the user query comprise suitable refinement tags comprising further selection items that can be chosen by the user, for instance, with a mouse click.

In the case of feedback within the search bar, the bar provides smart assistance to the user in narrowing down the results of the first query, 'shoes', based on the type of products present in the catalogues (i.e. using the result of the back-end processing responsible for entity recognition and matching). In this implementation, when the user clicks on the bar again 404, the front-end side of the system will remove the augmented data 406 to let the user type again in the standard way—as the user asks a second time, e.g. 'shoes red', all the above-explained cycle, from the back-end to the front-end processing, starts again.

The following is a non-limiting example embodiment of the present invention. Only basic features are present in the following example workflow. Other features like, for example, information about user history and current navigation are not expressed in the workflow even if can be implemented and are to be considered part of the invention as well.

Figure 7:
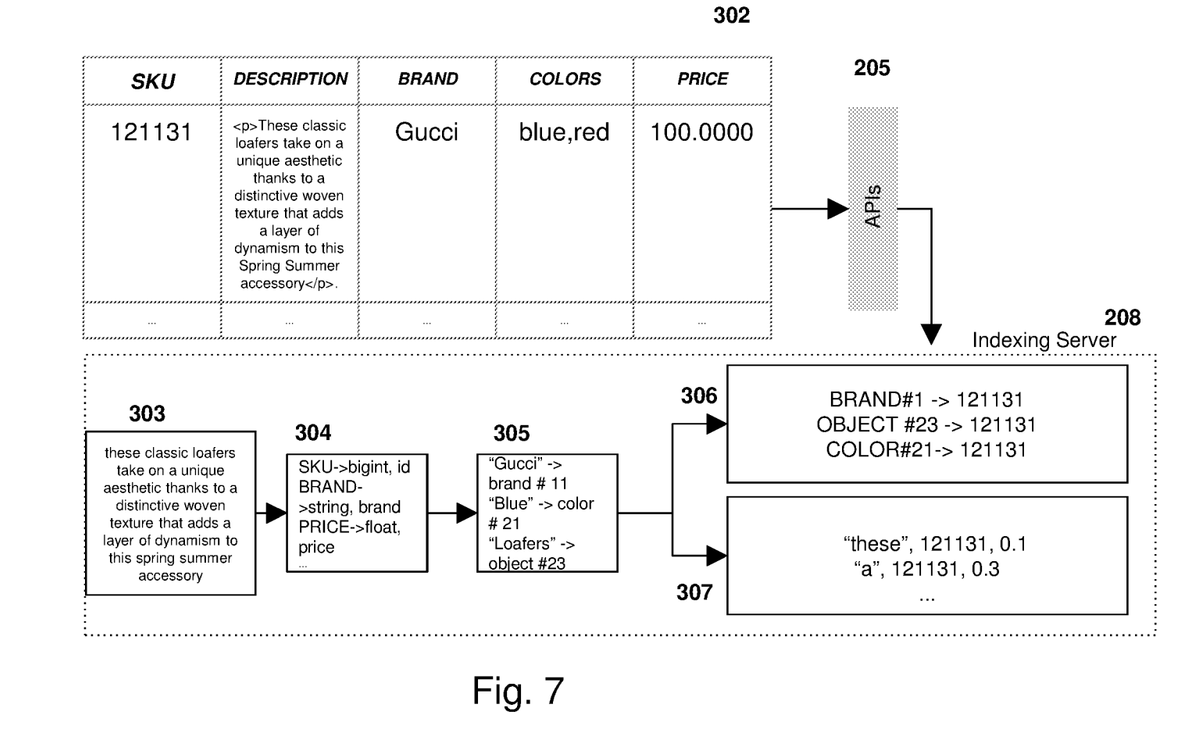
FIG. 7 shows a schematic diagram of an example of indexing according to an embodiment of the present disclosure.
Figure 8:
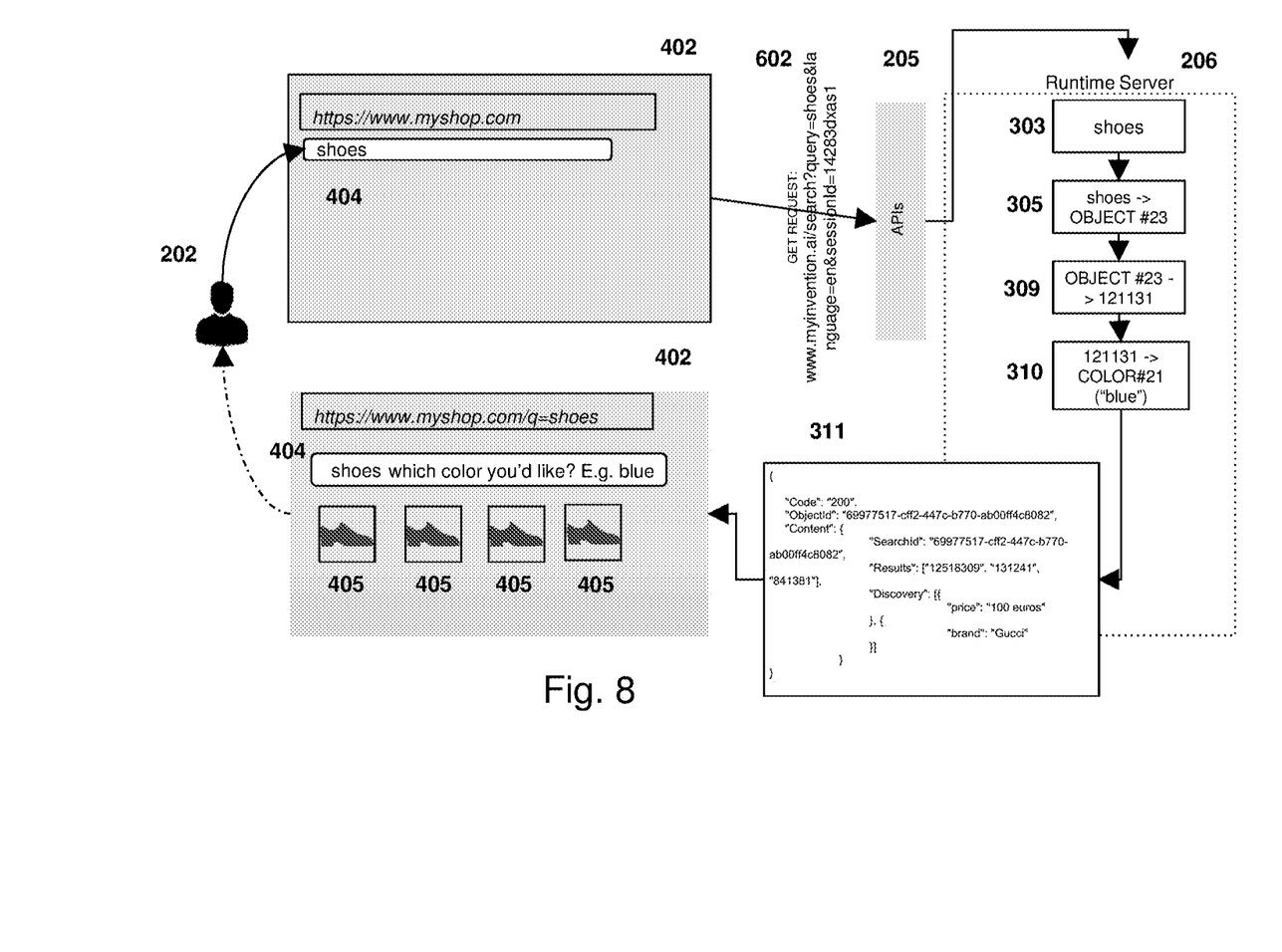
FIG. 8 shows a schematic diagram of an example of runtime search and discovery according to an embodiment of the present disclosure.

The operation of the system according to the present invention comprise two distinct phases: indexing depicted in enclosed FIG. 7 and runtime search and discovery depicted in enclosed FIG. 8.

The indexing phase articulates as follows:

a) A digital fashion shop, on the example website myshop. com, has the information about its catalogue structured in a table 302.

b) The catalogue 302 is transmitted to an indexing back-end server 208 (for example through some standard APIs 205).

c) The indexing back-end server 208 processes the catalogue with the following steps:

aa) Data are cleaned 303; in the example of FIG. 7 all the text contained in the column DESCRIPTION is transformed into lowercase and punctuation and html tags are removed;

bb) The column type is inferred 304; in the example of FIG. 7, SKU is detected to be a column of integer numbers used as unique identifiers for product, BRAND is a column containing as string the name of brands producing items in the catalogue, PRICE is detected as a column containing floating point numbers equivalent to prices etc.;

cc) Entities are inferred 305: in this example of the invention, Gucci is marked as a brand and loafers is identified as the target object after the previous step 304, employing domain knowledge and possibly other statistical models (machine learning models, bayesian inference, etc.).

dd) The relations between entities/properties—and any meta-data and information regarding the ontology of the items in the catalogue—and items is stored 306, possibly using intermediate IDs (e.g. COLOR #21 instead of 'blue').

ee) The relations between words (from fields in the table 302 and/or meta-data and/or labels generated through step 305, etc.) and items is stored 307 to be retrieved efficiently (for example, using an inverted index or a similar data structure). The relation can be stored in any way deemed fit in the given implementation of the system (e.g. words and documents can be substituted by integers without loss of generality as long as the mapping is stored as well, etc.), as long as it allows to retrieve candidates item starting from words/labels/meta-data or any other form of linguistic/conceptual representation.

The indexing phase is finished: the system has extracted entities and properties from structured text and has stored them efficiently to retrieve the information at runtime. The next phase refers to the search and discovery or querying phase and applies when a user visits the myshop.com website and start searching using the system according to the present invention.

The querying phase implements the feedback loop with the user, where back-end side and front-end side of the system according to the present invention come together to offer an interactive way of searching in the source data source through constant interaction with a smart search bar.

The querying phase articulates as follows:

d) A user 202 lands on the example web page myshop. com page 402 and uses the search bar 404 to search for 'shoes'.

e) Myshop.com access the runtime server 206 of the system according to the present invention through an internet connection and standard digital communication, as, for example in this embodiment, through a GET request 602 (specifying some relevant parameters, such as for example, language, query and a unique id for the http session:
www.myinvention.ai/
search?query=shoes&language=en&sessionId=14283dxas1)
to a set of APIs 205.

f) The APIs 205 provide access to the runtime server 206. Then the runtime server 206 takes as input the user query 'shoes' and the relevant parameters specified before and performs the following sub-steps:

ff) the query is cleaned 303;

gg) the entity OBJECT #23 is recognized 305 as being in the query;

hh) items that are relevant (given the input parameters, historical data, statistical analysis, matching ontology, etc.) are retrieved 309 from the storage. In this example case, object with identifier 121131;

ii) the ontology that has been previously stored at step 306 is consulted 310 to retrieve a property that will help the user further navigate the result set, in this case, the color blue. As explained, this retrieval can be accomplished in many ways under the Invention, such as using statistical modelling, automated reasoning, case-based reasoning, etc.;

ll) the final response to the calling website is prepared 311, wrapping together the results of the data processing, that are deemed, in the particular implementation, to be important for the front-end or client side of the system according to the present invention. A sample JSON response is provided as a way of exemplifying the presence, in the response channel, of information about both relevant items and the discovery process.

g) When the response 311 is back to the page myshop.com 402, it is used to paginate the results (in the example, a list of shoes 405) for the user 202 who is browsing the website;

h) Furthermore, when the response 311 is back to the page myshop.com 402, it is used by the front-end or client side of the system according to the present invention to augment the content of the search bar 404 with a custom message, such as for example 'which color you'd like? E.g. blue'. This message invites the user to further narrow down her tastes by using a smart feature provided by the back-end code of the invention, i.e. knowing the ontology of the underlying catalogue the technology can provide a useful suggestion for the user instead of letting him browse dozens of unspecified items (in this case, 'shoes'). In the example of FIG. 8 the Discovery object in the response 311 is used.

i) By reading the suggestion, the user can then enter in the search a refined search, such as 'blue shoes' and the loop is back at step d) above and can be repeated with further features (for example, the next iteration may ask a price range, e.g. 'how much you'd like to spend?').

The invention claimed is:

1. A system for searching and discovering information comprising:
 a first server comprising an e-commerce digital catalogue of items and connected to a communication network;
 a front-end client associated with a user and connected to said communication network; and
 a back-end server connected to said communication network, said back-end server comprising in turn:
  an indexing section adapted to process data of said digital catalogue by:
   cleaning and normalizing the data of said digital catalogue;
   detecting one or more data types from one or more data fields of said data;
   assessing relevant data fields of said data based on a confidence score for the detected one or more data types;
   extracting entities and properties from data of the relevant data fields using at least one method selected from a group consisting of rule-based tagging, regular expression assessment, statistical procedures, neural networks, Bayesian inference, and automated reasoning from formal ontologies;
   storing said extracted entities and properties in a database according to an ontology; and
   building an index with the extracted entities and properties and associated data types of the data of said digital catalogue according to the ontology; and
  a runtime section adapted to interpret a user query received from said front-end client, compare the user query and/or user behavior with said ontology and said index, and send to said front-end client suggestions to the user on how to refine said query, thereby providing an interactive search loop.

2. The system according to claim 1, wherein said runtime section is further adapted to:
 clean and normalize the user query;
 extract the entities and properties from relevant fields of said user query;
 retrieve all matching items in said index built with the data source that match the query by the user based on the extracted entities and properties of the query;
 determine a most appropriate feature to promote discovery in said digital catalogue based on the relevant fields of the data of said digital catalogue, on the retrieved matching items and on the user behavior;
 produce a response to the user, said response containing a list of results and a list of discovery features; and
 send said response to said front-end client.

3. The system according to claim 1, wherein said communication network is the Internet network.

4. The system according to claim 1, wherein the communication between said front-end client and said back-end server is made through a set of application programming interfaces (APIs).

5. A method for providing search and discovery information from a digital catalogue of items on a first server connected via a communication network to a front-end client associated with a user, said user making a user query regarding items of said digital catalogue, the method comprising:
 (i) reading and processing data of said digital catalogue by a back-end server connected to said communication network by:
  cleaning and normalizing the data of said digital catalogue;
  detecting one or more data types from one or more data fields of said data;
  assessing relevant data fields of said data based on a confidence score for the detected one or more data types;
  extracting the entities and properties from data of the relevant data fields using at least one method selected from a group consisting of rule-based tagging, regular expression assessment, statistical procedures, neural networks, Bayesian inference, and automated reasoning from formal ontologies;
  storing said extracted entities and properties in a database according to an ontology; and
  building an index with the extracted entities and properties and associated data types of the data of said digital catalogue; and
 (ii) interpret, by said back-end server, the user query, compare the user query and/or user behavior with said ontology and said index and send to said front-end client suggestions to the user on how to refine said query, thereby providing an interactive searching loop.

6. The method according to claim 5, wherein the step (ii) comprises the steps of:

cleaning and normalizing the user query;
extracting the entities and properties from relevant fields of said user query;
retrieving all matching items in said index built with the data source that match the user query based on the extracted entities and properties of the query;
determining a most appropriate feature to promote discovery in said digital catalogue based on the relevant fields of the data of said digital catalogue and on the matching items, on the retrieved matching items and on the user behavior;
producing a response to the user query, said response containing a list of results and a list of discovery features; and
sending said response to said front-end client.

* * * * *